United States Patent [19]

Vasudevan

[11] Patent Number: 5,753,152
[45] Date of Patent: May 19, 1998

[54] PROCESS FOR MAKING POLYMER MATRIX CAPSULES CONTAINING LARGE HYDROCARBON DROPS SUITABLE FOR INCORPORATING LARGE SIZE ACTIVES TO BE USED IN LIQUID DETERGENT COMPOSITIONS

[75] Inventor: Tirucherai Varahan Vasudevan, West Orange, N.J.

[73] Assignee: Lever Brothers Company, Division of Conopco, Inc., New York, N.Y.

[21] Appl. No.: 524,307

[22] Filed: Sep. 6, 1995

[51] Int. Cl.⁶ .................................................. B01J 13/04
[52] U.S. Cl. ........................... 264/4.1; 264/4.3; 264/4.33
[58] Field of Search ........................... 264/4.1, 4.3, 4.33

[56] References Cited

U.S. PATENT DOCUMENTS

| | | |
|---|---|---|
| 4,090,973 | 5/1978 | Maguire et al. . |
| 4,801,544 | 1/1989 | Munk . |
| 4,906,396 | 3/1990 | Falholt et al. . |
| 5,035,900 | 7/1991 | Langley et al. . |
| 5,441,660 | 8/1995 | Tsaur et al. .................. 252/95 |
| 5,460,817 | 10/1995 | Langley et al. ............... 252/90 |

FOREIGN PATENT DOCUMENTS

92/20771  11/1992  WIPO .

*Primary Examiner*—Jeffrey Mullis
*Attorney, Agent, or Firm*—Ronald A. Koatz

[57] ABSTRACT

The present invention relates to a process for preparing matrix capsules having hydrocarbon cores sufficiently large to contain large size particle actives which process comprises dispersing actives in hydrocarbon core material, and dispersing the active containing hydrocarbon in a polymer solution to form a polymer matrix emulsion of drops of said core material in said solution. The key to the invention is to obtain the dispersion by utilizing low shear rates previously uncontemplated using the standard shearing machinery of the art. This in turn is accomplished by maintaining the core within defined rheological parameters. By using lower shear rates, applicants were unexpectedly able to prepare capsules capable of stably incorporating large size actives in the core.

24 Claims, No Drawings

PROCESS FOR MAKING POLYMER MATRIX CAPSULES CONTAINING LARGE HYDROCARBON DROPS SUITABLE FOR INCORPORATING LARGE SIZE ACTIVES TO BE USED IN LIQUID DETERGENT COMPOSITIONS

BACKGROUND OF THE INVENTION

Field of the Invention

The present invention relates to polymer matrix capsules which comprise actives dispersed in a hydrocarbon core material (in the form of hydrocarbon drops containing the actives) wherein the hydrocarbon material containing the actives is in turn dispersed in a polymer matrix. The capsules are generally made by (1) dispersing actives into drops of a hydrocarbon core material; (2) then dispersing the active containing hydrocarbon core material into a polymer solution to form an emulsion of hydrocarbon drops in polymer solution; and (3) spraying the oil/hydrocarbon dispersed in polymer into a hardening solution to cure the polymer around the hydrocarbon core. The invention relates to an improved method of making the capsules wherein the hydrocarbon core drops can be made suitably large to incorporate large size actives such that the actives won't be readily released from the hydrocarbon core material when the hydrocarbon core material is being dispersed in polymer solution (step (2)).

BACKGROUND

Encapsulation of sensitive ingredients, especially detergent enzymes, has been in practice for a number of years. Techniques range from encapsulating the enzymes in a reverse micelle (see U.S. Pat. No. 4,801,544 to Munk) to protecting them in a hydrocarbon fluid such as silicone oil and petroleum jelly (see U.S. Pat. No. 4,906,396 to Falholt et al.) or in a solid surfactant (see U.S. Pat. No. 4,090,973 to Maguire et al.) or in a polymer matrix (WO 92/20,771). In many of the prior inventions, the enzyme is used either as an aqueous solution or as a finely dispersed colloidal size solid (=1 μm and less). In the particular invention where large enzyme particles were used (U.S. Pat. No. 4,090,973), 1 μm to 2 mm, the particles were dispersed in a hydrophobic core which was directly incorporated (dispersed) into the detergent formulation and not into a polymer matrix, as carried out in the present invention. The polymer matrix has been found to be necessary to achieve the desired enzyme stability in liquid detergent systems containing bleach particles. The dispersion of hydrocarbon core material into the polymer solution is one of the most challenging steps.

Capsules comprising solid actives inside a hydrocarbon or oil core and surrounded by a hardened polymer solution are known, for example, from applicants' copending application numbers, U.S. Ser. No. 150,701 and U.S. Ser. No. 151,605, both to Tsaur et al. and both of which are incorporated by reference into the subject application.

In these references, the capsule could be made using a "matrix capsule method" (such as described on page 25 of U.S. Ser. No. 150,701, for example) or using a "core shell" method such as described on page 37 of the same application. The matrix capsule method is characterized by the fact that the actives are found inside of drops of hydrocarbon core material rather than one large hydrocarbon core as in the core shell method.

In the matrix capsule method of that invention, active material (e.g., enzyme) is mixed with a hydrocarbon material (e.g., silicone oil with dispersed enzyme particles). The hydrocarbon core drops containing enzyme are then dispersed in a polymer solution (e.g., Acrysol ASE-95) using an overhead mixer. The homogenizer/mixer used in that case cannot make droplets large enough under homogeneous mixing conditions to allow incorporation of large active particles. In other words, one can make large size particles, but the compositions will not properly mix.

In the core shell method (different from the matrix capsule method of the invention), larger size actives can be incorporated using a specially designed triple nozzle, but applicants have found this system to be rate limiting and not suitable for commercial scale-up.

U.S. Pat. No. 4,906,396 to Falholt discloses the encapsulation of enzyme particles in the size range of 1 μm to 2 mm in a hydrocarbon core material such as silicone oil or petroleum jelly. The capsules made in that invention, however, fail to teach a polymeric shell around the hydrocarbon core. This shell is very important in boosting the stability of active, for example, in bleach containing liquids.

WO 92/20,771 to Allied Colloids discloses capsules having a hydrocarbon core and polymeric shell. The core requires a hydrophobic matrix polymer to keep active from migrating too quickly out of an oil layer. This is not required in the present capsules. Moreover, active encapsulated by the process of that reference are in the colloidal range (about 1 μm). Thus, droplet size of the core is in the 10–30 μm range rather than in the 100–1000 μm range required for large actives. Further, using the homogenizer recommended in that reference, applicants were unable to produce larger size droplets because of poor mixing. While not wishing to be bound by theory, it is believed that, because of the inherent design of the homogenizer, mixing will be extremely poor at the low shear rates required to make large droplets (accomplished by decreasing rotor speed or RPM). More specifically, these homogenizers are designed to operate at high shear rates (i.e., $\geq 10,000$ s$^{-1}$). That is, they are designed to make droplets much smaller (typically 100 times smaller) than those of the subject invention.

Accordingly, in a matrix capsule method for making capsules, there is a need in the art for a way of producing large droplet sizes (required for containing large size actives) while still producing good mixing (i.e., maintaining stable capsules).

SUMMARY OF THE INVENTION

Applicants have found that if active containing hydrocarbon core drops are dispersed in polymer solution using a device producing a low (i.e., 10,000 s$^{-1}$ and below) but controlled shear rate, it is possible to retain large size hydrocarbon core droplets (i.e., 10 to 1000 microns) while maintaining good mixing. This in turn allows the incorporation of actives ranging in size from 0.01 to 500 microns while still providing a dispersion which is physically stable for at least 8 hours. Physical instability can be defined by either an increase in the droplet size which occurs as a result of flocculation followed by coalescence of drops; or by separation of the two phases such that the top organic layer constitutes at least 5% by volume of the total emulsion. The process of the invention allows the production of polymer matrix capsules comprising large size solid or liquid actives including actives dissolved in aqueous solution, said solution being physically stable as defined above.

More particularly, the present invention provides a process for incorporating actives having a size of 0.01 to 500 microns into a capsule used in liquid detergent compositions wherein said capsule comprises (a) actives subject to degradation in said liquid detergent; (b) a hydrocarbon core surrounding said actives; and (c) a polymer shell surrounding said hydrocarbon core, wherein said process comprises (1) dispersing said actives into a hydrocarbon core material; and (2) dispersing said actives containing hydrocarbon core material in a polymer solution using a device which mixes the hydrocarbon material and said polymer solution;

wherein no more than 50%, preferably no more than 25%, more preferably, no more than 10% of solid are released from the hydrocarbon core drops during dispersion;

wherein the hydrocarbon core droplets remaining after dispersing in polymer solution are 10 to 1000 microns; preferably 100 to 1000, more preferably 200 to 1000, more preferably 300 to 1000 microns in size; and wherein the dispersion of drops in polymer solution is physically stable (as defined above) for 8 hours or greater.

Preferably, the device used to mix the hydrocarbon core drops and polymer solution is a flotation machine. This machine is conventionally used for beneficiation of mineral ores and, as far as applicants are aware, has not been used for dispersion/emulsification of oil in polymer solutions. Flotation machine can produce shear rates of less than 10,000 $s^{-1}$, preferably less than shear 5000 $s^{-1}$, more preferably less than about 3500 $s^{-1}$, even more preferably less than 1000 $s^{-1}$, while still maintaining good mixing.

Generally, after the active containing hydrocarbon drops are dispersed in polymer solution, the hydrocarbon/oil is sprayed into a hardening solution (e.g., acid electrolyte bath) to cure the polymer around the hydrocarbon core.

DETAILED DESCRIPTION OF THE INVENTION

The present invention is concerned with a process for making polymer matrix capsules such as those described in U.S. Ser. Nos. 150,701 and 151,605, both of which are incorporated by reference into the subject application.

More particularly, the capsules made by the process of the invention comprise (a) an active subject to degradation by components in an aqueous liquid cleaning composition in which they are found;

(b) a hydrocarbon core (in the matrix capsule, these are in the form of hydrocarbon core droplets each containing the active (a) rather than one large core containing active (a) such as is made in the core shell method which is not part of the subject invention); and (c) a polymer shell matrix surrounding the hydrocarbon core drops.

The hydrocarbon/oil core drops of the invention are defined by meeting each of three defined criteria set forth below: (1) by their ability to retain active in the dispersion in an aqueous solution; (2) by their ability to withstand phase separation at ambient or elevated temperatures over time; and (3) by their ability to rapidly and effectively release the encapsulated actives in use. As noted, the oils must meet all three defined criteria to be selected as the oil component of the invention.

According to the first criterion, the oil component is defined by its ability to retain at least 50% active, preferably 75%, more preferably 90% after adding the active in oil dispersion to an aqueous solution. Typically, the actives will stay in the oil for at least an hour and up to weeks and months if not more.

A second criterion by which the oil component is defined is its ability to hold the active in place and to prevent the active from diffusing or precipitating out of the oil phase. The stability of active in oil dispersion can be determined by adding the active in oil dispersion to a 10 ml graduated cylinder and measuring the phase separation of the active from the hydrophobic oil. It should be less than 10%, preferably less than 5% of phase separation when measured at 37° C. for 1 week.

The last criterion used to define the oil component is its ability to rapidly and effectively release the active in use. The oil release property can be determined by a standard Terg-O-Meter washing method. Terg-O-Meter are well known in the art such as, for example Terg-O-Tometer UR7227. In these devices, generally, 500 mls of wash liquid are agitated at above 70 rpm for about 20 minutes using desired wash liquid. The capsules of the invention were tested using 1000 mls at 100 rpm for 15 and 30 minutes in the range of 20°–40° C.

The capsule should release more than 50%, preferably more than 70% of the active after the first five minutes of the wash cycle when measured at 50° C.

The hydrophobic oil component can be a liquid or a semisolid at room temperature. Liquid oils alone with a viscosity of less than 10,000 centipoises (cps) such as mineral oils, silicone oils or vegetable oils are not suitable for this invention and require modification. These oils do not have the capability to hold and retain hydrophilic actives and do not provide sufficient protection to the active in a liquid detergent. The preferred liquid oil components are oils containing hydrophobic particles with particle size less than 3μ, preferably less than 1μ, more preferably less than 0.1μ. Examples of such hydrophobic particles are hydrophobic silica such as Cabot's Cab-O-Sil TS 720 and Cab-O-Sil TS 530 or Degussa's Aerosil 200; and hydrophobic clay such as Rheox's Bentone SD-1. These hydrophobic particles can be incorporated into the oil physically i.e., simply by mixing the oil with the hydrophobic particles or chemically, i.e., through the chemical interaction of oil with the surface of the particles. The preferred hydrophobic particles are submicron sized hydrophobically modified fumed silica such as Cab-O-Sil TS 720. These hydrophobic particles can enhance the suspension of actives in the oil and also increase the capability of oil to retain the actives in an aqueous solution. Typically the amount of hydrophobic particles in the oil is less than 15%, preferably less than 10%, more preferably less than 5% but more than 0.5% should be used.

In preferred embodiments of the invention, the oil component is defined by the fact that it is a semisolid rather than a liquid at room temperature. Specifically, when the component has a melting temperature of from about 35° C. to 70° C., preferably 40° C. to 65° C., the semisolids are found to retain the active more readily. Moreover, such materials release active under wash condition rapidly enough to give wash performances comparable to compositions in which enzymes have been newly added. Since these semisolid oils will also slow migration of actives out of the oil phase or slow migration of bleach and other harsh components toward the actives, they are again preferred.

Examples of such semisolid oils are petrolatums such as Penreco's Penreco Snow, Mineral Jelly and Tro-Grees; Witco's Multiwax; and fats (e.g., glyceryl ester of $C_{12}$–$C_{24}$ fatty acids) or fat derivatives such as mono-, di- or triglycerides and fatty alkyl phosphate ester. Hydrophobic particles such as hydrophobic fumed silica are also desirably incorporated into these semisolid oils to further enhance their ability to retain actives, especially when the capsule of this invention is processed or stored at a temperature close to or above the melting point of the semisolid oils.

The rheological behavior of the appropriate core component (oil phase) can be described in terms of a Sisko rheological model (H. A. Barnes, J. F. Hutton and K. Walters; An Introduction to Rheology; 1989; Elsevier Publishers) described by:

$$\eta = \eta_\infty + k\, \gamma^{n-1}$$

where:

$\eta$, $\eta_\infty$—Viscosity at a given shear rate and infinite shear viscosity respectively;

$\gamma$—Shear rate; and k, n—Sisko constants.

Most preferred hydrocarbon cores (oil phase) are those in which the value of k is in the range of 10,000 to 50,000, preferably 20,000 to 40,000; n is in the range of 0.2 to 0.6, preferably 0.3 to 0.5 and $\eta_{28}$ is in the range of 50 to 2,000 centipoises, preferably 100 to 1000 centipoises.

These parameters describe a composition which is easy to mix (i.e., mixes easily at low shear rate) yet has a high viscosity at rest.

The polymer suitable for the polymer shell of the capsule of the invention must be insoluble in the composition of the liquid cleaning product and must disintegrate or dissolve during the use of the product simply by dilution with water, pH change or mechanical forces such as agitation or abrasion. The preferred polymers are water soluble or water dispersible polymers that are or can be made insoluble in the liquid detergent composition. Such polymers are described in EP 1,390,503; U.S. Pat. No. 4,777,089; U.S. Pat. No. 4,898,781; U.S. Pat. No. 4,908,233; U.S. 5,064,650 and U.S. Ser. Nos. 07/875,872 and 07/875,194, all of which are incorporated by reference into the subject application.

These water soluble polymers display an upper consulate temperature or cloud point. As is well known in the art (P. Molyneaux, Water Soluble Polymers CRC Press, Boca Raton, 1984), the solubility or cloud point of such polymers is sensitive to electrolyte and can be "salted out" by the appropriate type and level of electrolyte. Such polymers can generally be efficiently salted out by realistic levels of electrolyte (<10%). Suitable polymers in this class are synthetic nonionic water soluble polymers including: polyvinyl alcohol; polyvinyl pyrrolidone and its various copolymers with styrene and vinyl acetate; and polyacrylamide and its various modification such as those discussed by Molyneaux (see above) and McCormick (in Encyclopedia of Polymer Science Vol 17, John Wiley, New York). Another class of useful polymers are modified polysaccharides such as carrageenan, guar gum, pectin, xanthan gum, partially hydrolyzed cellulose acetate, hydroxy ethyl, hydroxy propyl and hydroxybutyl cellulose, methyl cellulose and the like. Proteins and modified proteins such as gelatin are still another class of polymers useful in the present invention especially when selected to have an isoelectric pH close to that of the liquid composition in which the polymers are to be employed.

From the discussion above, it is clear that a variety of hydrophilic polymers have potential utility as the polymer coating for the capsules of this invention. The key is to select an appropriate hydrophilic polymer that would be essentially insoluble in the composition (preferably a concentrated liquid system) under the prevailing electrolyte concentration, yet would dissolve or disintegrate when this composition is under conditions of use. The tailoring of such polar polymers is well within the scope of those skilled in the art once the general requirements are known and the principle set forth.

The fraction of polymer solution (aqueous solution) which will form the polymer matrix continuous phase should be such that the ratio by weight of organic core to polymer solution is in the range of 0.001 to 100, preferably 0.01 to 10, and most preferably 0.05 to 5.

The rheological characteristics of the polymer solution can be described in terms of a Sisko rheological model described earlier in the present specification. Most preferred polymer solutions are those in which k varies in the range of 500 to 20,000, more preferably 1,000 to 15,000; n varies in the range of 0.2 to 0.6, more preferably 0.3 to 0.5 and $\eta_{28}$ varies in the ranges of 100 to 2,000 centipoises, more preferably 2,000 to 1,000 centipoises and most preferably 300 to 500 centipoises.

Again, this defines where viscosity is relatively high at rest, yet relatively low when mixing.

Actives

The active materials which are desired to be encapsulated by the capsule of this invention are those materials which will lose their activity in a cleaning product, especially a bleach-containing liquid cleaning product, if no hydrophobic oil coating is added according to this invention. The active materials protected by the oil layer may be a hydrophilic active (e.g., enzyme or bleach catalyst) or a hydrophobic active (e.g., perfume) and can be solid, liquid or in aqueous solution. If it is a solid material, the particle size of the active are typically 0.01 to 500μ, preferably 0.01 to 400μ, more preferably 0.01 to 50μ. Large size active particles of 250–500μ, preferably 100–400μ can be readily made using the process of the invention, but due to formulation constraints, more typically, the particles have an average size of about 50 to 100μ. Of course, since a hydrophobic active is generally readily protected by an oily layer and is generally not readily degraded by harsh components in composition, the benefits of the invention are more readily apparent when the active ingredient is a hydrophilic one. Hydrophilic active materials include enzymes, bleach catalysts, peracid bleaches, bleach activators and optical brighteners.

One preferred ingredient of the capsules disclosed herein is an enzyme. The enzymes may be amylases, proteases, lipases, oxidases, cellulases or mixtures thereof. The amylolytic enzymes for use in the present invention can be those derived from bacteria or fungi. Preferred amylolytic enzymes are those described in British Patent Specification No. 1,296,839, cultivated from the strains of *Bacillus licheniformis* NCIB 8061, NCIB 8059, ATCC 6334, ATCC 6598, ATCC 11,945, ATCC 8480 and ATCC 9945A. A particularly preferred enzyme is an amylolytic enzyme produced and distributed under the trade name, Termamyl, by Novo Industri A/S, Copenhagen, Denmark. These amylolytic enzymes are generally sold as granules and may have activities from about 2 to 10 Maltose units/milligram. The amylolytic enzyme is normally included in an amount of from 1% to 40% by weight of the capsule, in particular from 5 to 20% by weight.

The actives may also be a proteolytic enzyme. Examples of suitable proteolytic enzymes are the subtilisins which are obtained from particular strains of *B. subtilis* and *B. licheniformis*, such as those commercially available under the trade names Maxatase, supplied by Gist-Brocades NV, Delft, Netherlands, and Alcalase, supplied by Novo Industri A/S, Copenhagen, Denmark. Particularly preferred are the proteases obtained from a strain of Bacillus having a maximal activity throughout the pH range of 8–12, being commercially available under the trade names of Esperase and Savinase, sold by Novo Industri A/S. These proteolytic enzymes are generally sold as granules and may have enzyme activities of from about 500 to 50,000 glycine units/milligram. The proteolytic enzyme is normally included in an amount of from about 1% to about 40% by weight of the capsule, in particular of from 5% to 20% by weight.

Lipolytic enzymes may also be included in order to improve removal of fatty soils. The lipolytic enzymes are preferably included in an amount of from about 1% to about 40%, preferably from 5% to 20% by weight. Cellulase enzymes may be used in an amount from about 1% to 40% by weight of the capsule.

The total content of the enzyme in the capsules of the present invention is from about 1% to about 40%, preferably from about 3% to about 15%.

It should be understood that the enzyme may also be a genetically engineered variation of any of the enzymes described have engineered to have a trait (e.g., stability) superior to its natural counterpart.

The protected actives may also be peroxygen compound activators, peracid bleaches, bleach catalysts, optical brighteners or perfumes.

Peroxygen compound activators are organic compounds which react with the peroxygen salts (e.g. sodium perborate, percarbonate, persilicate) in solution to form an organic peroxygen acid as the effective bleaching agent. Preferred activators include tetraacetylethylenediamine, tetraacetyglycoluril, glucosepentaacetate, xylose tetraacetate, sodium benzoyloxybenzene sulfonate and choline sulfophenyl carbonate. The activators may be released from the capsule to combine with peroxygen compound in the composition.

When activator is included, the ratio between the peroxygen in solution and the activator lies in the range of from 8:1 to 1:3, preferably 4:1 to 1:2, and most preferably is 2:1.

Although peroxyacids are generally contemplated for use in the composition rather than the capsule, peroxyacid compounds may be used as the active in the capsule as well, particularly in compositions where conditions are so harsh as to deactivate the peroxyacid.

Generally the peroxyacids are amido or imido peroxyacids and are present in the range from about 0.5 to about 50%, preferably from about 15 to about 30% by weight of the capsule. Preferably, the peroxyacid is an amide peracid. More preferably, the amide is selected from the group of amido peracids consisting of N,N'-Terephthaloyl-di(6-aminopercarboxycaproic acid) (TPCAP), N,N'-Di(4-percarboxybenzoyl)piperazine (PCBPIP), N,N'-Di(4-Percarboxybenzoyl)ethylenediamine (PCBED), N,N'-di(4-percarboxybenzoyl)-1,4-butanediamine (PCBBD), N,N'-Di(4-Percarboxyaniline)terephthalate (DPCAT), N,N'-Di(4-Percarboxybenzoyl)-1,4-diaminocyclohexane (PCBHEX), N,N'-Terephthaloyl-di(4-amino peroxybutanoic acid) ($C_3$ TPCAP analogue called TPBUTY) N,N'-Terphthaloyl-di(8-amino peroxyoctanoic acid) ($C_7$ TPCAP analogue called TPOCT), N,N'-Di(percarboxyadipoyl)phenylenediamine (DPAPD) and N,N'-Succinoyl-di(4-percarboxy)aniline (SDPCA). Such compounds are described in WO 90/14,336.

Other peroxyacids which may be used include the amidoperoxy acids disclosed in U.S. Pat. Nos. 4,909,953 to Sadowski and U.S. Pat. No. 5,055,210 to Getty, both of which are incorporated by reference into the subject application.

Also, the active inside the compounds may be a bleach catalyst (i.e. for activating peracids found in the composition outside the capsule).

Examples of such catalysts include manganese catalysts of the type described in U.S. Pat. No. 5,153,161 or U.S. Pat. No. 5,194,416, both of which are incorporated by reference into the subject application; sulfonomine catalysts and derivatives such as described in U.S. Pat. Nos. 5,041,232 to Batal, U.S. Pat. No. 5,045,223 to Batal and U.S. patent No. 5,047,163 to Batal, all three of which are incorporated by reference into the subject application.

More particularly, manganese catalysts include, for example, manganese complexes of the formula:

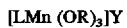    IV wherein

Mn is manganese in the +4 oxidation state;

R is a $C_1$–$C_{20}$ radical selected from the group consisting of alkyl, cycloalkyl, aryl, benzyl and radical combinations thereof;

at least two R radicals may also be connected to one another so as to form a bridging unit between two oxygens that coordinate with the manganese;

L is a ligand selected from a $C_3$–$C_{60}$ radical having at least 3 nitrogen atoms coordinating with the manganese; and Y is an oxidatively-stable counterion.

The sulfonomines include compounds having the structure:

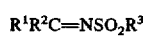

wherein:

$R^1$ may be a substituted or unsubstituted radical selected from the group consisting of hydrogen, phenyl, aryl, heterocyclic ring, alkyl and cycloalkyl radicals;

$R^2$ may be a substituted or unsubstituted radical selected from the group consisting of hydrogen, phenyl, aryl, heterocyclic ring, alkyl, cycloalkyl, $R^1C=NSO_2R^3$, nitro, halo, cyano, alkoxy, keto, carboxylic, and carboalkoxy radicals;

$R^3$ may be a substituted or unsubstituted radical selected from the group consisting of phenyl, aryl, heterocyclic ring, alkyl, cycloalkyl, nitro, halo and cyano radicals;

$R^1$ with $R^2$ and $R^2$ with $R^3$ may respectively together form a cycloalkyl, heterocyclic, and aromatic ring system.

Sulfonomine derivatives include compounds having the structure:

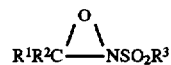

wherein:

$R^1$ may be a substituted or unsubstituted radical selected from the group consisting of hydrogen, phenyl, aryl, heterocyclic ring, alkyl and cycloalkyl radicals;

$R^2$ may be a substituted or unsubstituted radical selected from the group consisting of hydrogen, phenyl, aryl, heterocyclic ring, alkyl, cycloalkyl,

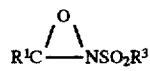

nitro, halo, cyano, alkoxy, keto, carboxylic and carboalkoxy radicals;

$R^3$ may be substituted or unsubstituted radical selected from the group consisting of phenyl, aryl, heterocyclic ring, alkyl, cycloalkyl, nitro halo, and cyano radicals;

$R^1$ with $R^2$ and $R^2$ with $R^3$ may respectively together form a cycloalkyl, heterocyclic, and aromatic ring system.

Bleach activators are particularly good candidates for bleach encapsulation both because they are used in very small amounts and because they are readily deactivated in solution.

More specifically, bleach activators are used in an amount from about 1% to 30% by weight of the capsule composition, preferably, 3% to 15% by weight.

As mentioned above, the actives may also be optical brighteners or perfumes.

Process

The present invention revolves around an improved method for making the capsules defined above such that large size actives can be protected. It is extremely important to prepare capsules that protect large size actives, since majority of actives such as bleaches and enzymes are commercially available only in large sizes and milling them to smaller sizes can be prohibitive from economic, safety and stability standpoints. The key to this, in turn, is to be able to create an emulsion of hydrocarbon drop (disperse phase) in polymer solution (continuous phase) where the emulsion can be prepared while retaining droplets having a particle size of 10 to 1000 microns, preferably 50 to 1000, more preferably 100 to 1000, more preferably 200 to 1000, more preferably 300 to 1000, and most preferably 400 to 1000 microns.

In general, the homogenizers used to emulsify the droplets into the polymer solution have never been able to create droplets of this range. This is because, if the shear rate is too low, mixing is very poor (versus good mixing of subject invention) and a stable emulsion cannot be successfully made. That is, the equipment conventionally used to make oil in water dispersions (or emulsion) work efficiently only at shear rates of greater than about $10,000s^{-1}$. At these rates:

(1) droplets produced are under 100 microns; and (2) solids inside the drops are released.

At lower than $10,000 S^{-1}$, as noted, it is not generally possible to make stable emulsions.

Unexpectedly, applicants have found that a flotation machine of the type used for beneficiation of mineral ores, under typical operating conditions for such machines, creates the type of shear (estimated shear rates of $500-3000s^{-1}$) required to produce the droplet sizes and lack of actives release from drops required for the invention.

Specifically, the process of the invention comprises:

(1) dispersing active particles into hydrocarbon core drop material (this can be done as either using an overhead mixer or milling the solid active—hydrocarbon core mixture using any type of attrition device such as a ball mill or a stirred media mill);

(2) dispersing the active containing hydrocarbon drops in a polymer solution to form a polymer matrix emulsion with the hydrocarbon drops as disperse phase and polymer solution as continuous phase; this step is done using a device which operates at shear rates low enough such that:

(a) no more than 50%, more preferably no more than 25%, most preferably no more than 10% of the active is released from the drops after shearing to form the emulsion;

(b) the hydrocarbon drops in the emulsion can be as large as 1000 microns, i.e., 10–1000 microns, preferably 100–1000, more preferably 200–1000, more preferably 300 to 1000, most preferably 400 to 1000 microns; and (c) the emulsion is physically stable for 8 hours or greater (physical stability as measured by no more than 5% phase separation).

One device which can be used to create this low shear rate such that the conditions described above are met is a flotation machine such as is described in Society of Mineral Engineers Handbook [N. L. Weiss Ed., Section 5, pg. 82–109] which is hereby incorporated by reference into the subject application.

The emulsion can be made in the temperature range of 5° to 80° C., preferably 10° to 60° C., more preferably 15° to 50° C. and most preferably 20° to 40° C.;

the concentration of fraction, expressed in weight, of the hydrocarbon drops/organic phase can be varied in the range of 0.1 to 99%, preferably 1 to 90%, more preferably 5 to 50% and most preferably 10 to 25%;

the loading of the active solids in the hydrocarbon drops/organic phase can be varied in the range of 0.001 to 99%, preferably 0.001 to 90%, more preferably 0.001 to 50% and most preferably 0.001 to 20%;

the impeller speed can be varied in the range of 10 to 100,000 rpm, preferably 50 to 5000 rpm, more preferably 100 to 2000 rpm and most preferably 500 to 1000 rpm.

After the emulsion is made, the matrix capsules of the subject invention are prepared by spraying the emulsion into a hardening solution to cure the polymer matrix around the hydrocarbon core drops; during spraying the liquid flow rate can be varied in the range of 0.001 to 100,000 gm/min., preferably 0.01 to 10,000 gm/min., more preferably 0.1 to 1,000 gm/min. and most preferably 1 to 100 gm/min; the mass ratio of liquid to air flow rates can be varied in the range of 0.001 to 100,000, preferably 0.01 to 1000; more preferably 0.1 to 100 and most preferably 1 to 10; the spray height can be varied in the range of 1 to 1000 cm, preferably 5 to 500 cm and most preferably 10 to 250 cm.

Unless stated otherwise, all percentages discussed in the examples and specification are percentages by wt.

The following examples are included to further illustrate and describe the invention and are not intended to limit the invention in any way.

EXAMPLE 1

This example is to compare the droplet sizes obtained using flotation machine relative to conventionally used homogenizers for producing emulsions.

Conditions used were as follows:

Aqueous phase=5 wt % PVA-ASE60 (2:1) solution with k=10,800, n=0.37 and $\eta_{28}$ =325 centipoises.

Organic phase=1:1 Tro-Grees: Petrolatum+15 wt. % sodium sulfate with k=25,600, n=0.06 and $\eta_{28}$ =890 centipoises. Temperature=23° C.

| Equipment | Sample Amount[1] grams | Mixing Time[2] minutes | Max Drop Size Microns | Mean Drop Size Microns |
|---|---|---|---|---|
| Flotation machine[3] | 400.0 | 1.0 | 600 | 440 |
| Homogenizer[3] | 150.0 | 0.5 | 250 | 210 |

[1]Minimum amount required for the size of the equipment used.
[2]Minimum time required to obtain homogeneous mixing as observed visually.
[3]Operated at minimum agitation conditions at which mixing was homogeneous.

The example shows that much larger droplet sizes can be obtained with the flotation machine than the conventionally used homogenizers, when the two machines are operated under their lowest possible shear rate (in other words speed) conditions at which homogeneous mixing as visually observed.

The estimated shear rate of the flotation machine under the tested conditions is 1000 s$^{-1}$ and that of the homogenizer is 3700 s$^{-1}$ (note, it was not possible to go below this shear rate while maintaining mixing).

Flotation machine used in our experiments is a model D-12 laboratory flotation machine purchased from Denver Equipment Company, Colorado Springs, Colo., USA. Although only the machine from the above mentioned manufacturer was used in our experiments, any flotation machine supplied by various suppliers such as Wemco, Agitair etc., can be used to make emulsions of the type described in the present invention.

EXAMPLE 2

Solid Release From the Hydrocarbon Droplet to Polymer Solution During Emulsification Denver D12 Flotation Machine
Impeller Speed=650 rpm
Aq. Phase=5 Wt. % PVA-ASE 60 (2:1) Solution
Org. Phase=1:1 Tro-Grees: Petrolatum plus 8 Wt. % Savinase Powder [Protease Enzyme, Ex: Novo]
Savinase Powder Particle Size about 1 to 50 microns
Temperature=25° C.; Aqueous Phase: Organic Phase=9:1 (wt./wt.)

| Source | | Emulsification | % Enzyme Released |
|---|---|---|---|
| Petrolatum | Tro-Grees | Time, Min. | Into Polymer Solution |
| Penreco | Penreco | 1.0 | 18.0 |
| | | 3.0 | 28.0 |
| | | 5.0 | 31.0 |
| Fisher | Penreco | 1.0 | 11.0 |
| | | 3.0 | 15.0 |
| | | 5.0 | 25.0 |

This example shows that the amount of enzymes released depends both on the source of petrolatum as well as emulsification time.

EXAMPLES 3–6

These examples show the effect of material and process parameters on the droplet size obtained with the flotation machine. In all the experiments sodium sulfate [approximately 10–50 μm in size] was used as the solid but any other solid can be used. The petrolatum samples used in all the example shown henceforth are obtained from Penreco.

EXAMPLE 3

Effect of Disperse Phase Composition on Droplet Size

Denver D12 Flotation Machine
Aq. Phase=5 wt % PVA-ASE 60*(2:1) solution
Impeller Speed=650 rpm
Aq.: Org. Phase (Petrolatum:Tro Grees)*=9:1 (wt/wt)
Agitation Time=2 min.
Temperature=23° C.

| Dis. Ph. Comp. Petr.:Tro-Grees | $D_{Vm}$ μm | $D_{gV}$ μm | $\sigma_g$ |
|---|---|---|---|
| 1:3 | 161 | 143 | 1.68 |
| 1:1 | 197 | 200 | 2.00 |
| 3:1 | Insufficient mixing; large clumps seen | | |

$D_{Vm}$ - volumetric mean droplet diameter
$D_{gV}$ - volume-based geometric mean
$\sigma_g$ - geometric standard deviation This examples shows that droplet size increases with increase in viscosity ratio, but above a certain value mixing obtained is poor.

*PVA—Polyvinyl alcohol [Airvol 540; ex: Air Products]
*ASE 60—Highly cross-linked polyacrylic acid [ex: Rohm & Haas]
*Petrolatum—Snow white petrolatum [ex: Penreco]
*Tro-Grees—Spray Tro-Grees [ex: Penreco]

EXAMPLE 4

Effect of Disperse Phase (Org. Phase) Concentration on Droplet Size

Denver D12 Flotation Machine
Aq. Phase=5 wt % PVA-ASE 60 (2:1) solution
Impeller Speed=650 rpm
Org. Phase=1:1 Tro-Grees:Petrolatum+15 wt % Sod. Sulfate
Temperature=23° C.
Agitation Time=2 min.

| Dis. Ph. Comp. wt % | $D_{Vm}$ μm | $D_{gV}$ μm | $\sigma_g$ |
|---|---|---|---|
| 10.0 | 197 | 200 | 2.00 |
| 14.3 | 381 | 400 | 1.81 |
| 25.0* | 210 | 200 | 1.90 |

$D_{Vm}$ - volumetric mean droplet diameter
$D_{gV}$ - volume-based geometric mean
$\sigma_g$ - geometric standard deviation
* - Unstable liquid; larger droplets found initially phase separated leaving the emulsion rich in small droplets.

This example shows that larger droplets can be obtained by increasing the disperse phase (organic phase volume) concentration, but above a certain concentration (25 wt % in this case) the droplets get too large to be stable in the aqueous phase.

EXAMPLE 5

Effect of Solids Loading of the Disperse Phase (Organic Phase) on Droplet Size

Denver D12 Flotation Machine
Aq. Phase=5 wt % PVA-ASE 60 (2:1) solution
Impeller Speed=650 rpm
Org. Phase=1:1 Tro-Grees:Petrolatum+15 wt % Sod. Sulfate
Temperature=23° C.
Agitation Time=2 min.
Aq.: Org.=9:1 (wt/wt)

| Solids loading (wt/wt) | $D_{Vm}$ μm | $D_{gV}$ μm | $\sigma_g$ |
|---|---|---|---|
| 15.0 | 280 | 282 | 1.60 |
| 22.5 | 276 | 272 | 1.90 |
| 30.0* | Phase separation occurred with organic phase settling to the bottom of the vessel | | |

$D_{Vm}$ - volumetric mean droplet diameter
$D_{gV}$ - volume-based geometric mean
$\sigma_g$ - geometric standard deviation This examples shows that increasing the solids concentration to 30.0 weight percent increases the density of the organic phase/hydrocarbon drops to a value (1.635 gm/cc in this case) at which phase separation occurs, at polymer concentration used in this example.

It should be understood that at higher polymer concentrations, higher solids loadings can be achieved.

EXAMPLE 6

Effect on Impeller Speed on Droplet Size

Denver D12 Flotation Machine
Aq. Phase=5 wt % PVA-ASE 60 (2:1) solution

Impeller Speed=650 rpm
Org. Phase=1:1 Tro-Grees:Petrolatum+15 wt % Sod. Sulfate
Temperature=23° C.
Agitation Time=2 min.
Aq.: Org.–9:1 (wt/wt)

| Speed rpm | $D_{Vm}$ μm | $D_{gV}$ μm | $\sigma_g$ |
|---|---|---|---|
| 550 | 310 | 310 | 1.80 |
| 650 | 280 | 282 | 1.60 |
| 750 | 220 | 205 | 2.00 |

$D_{Vm}$ - volumetric mean droplet diameter
$D_{gV}$ - volume-based geometric mean
$\sigma_g$ - geometric standard deviation This examples shows that, within the range tested, the droplet size is proportional to agitation speed and hence the shear rate.

EXAMPLE 7 and 8

These examples show conditions under which the emulsion can be sprayed in order to obtain capsules with desired properties.

EXAMPLE 7

This example is to show conditions under which the emulsion can be sprayed without rupturing the droplets.

Effect of Spraying Condiitons on Emulsion Droplet Size

Aqueous phase: 5 wt % PVA-ASE 60 (2:1) solution
Organic phase: 1:1 Tro-Grees-Petrolatum+15 wt % $Na_2SO_4$
Emulsification:
9:1 Aqueous:Organic phase
Flotation machine, 650 rpm, 2 min.

| Pressure, psig | | Flow Rate, gm/min. | | Droplet diameter, μm | | |
|---|---|---|---|---|---|---|
| Liquid | Air | Liquid | Air | $D_{Vm}$ | $D_gV$ | σ |
| — | — | — | — | 236 | 220 | 1.54 |
| 10 | 5 | 57.3 | 8.5 | 230 | 210 | 1.50 |
| | 10 | 55.2 | 13.6 | 294 | 300 | 1.60 |
| | 15 | 53.7 | 17.4 | 306 | 275 | 1.80 |
| 20 | 5 | 183.4 | 8.5 | 307 | 278 | 1.60 |
| | 10 | N/A | N/A | 266 | 256 | 1.90 |

$D_{Vm}$ - volumetric mean droplet diameter
Dgm - geometric mean
σ - geometric standard deviation This examples shows that under conditions of liquid and air pressure used, the emulsion can be sprayed without rupturing the emulsion droplet.

EXAMPLE 8

Effect of Relative Velocity and Spray Height on Aerosol Particle Size and Morphology Aqueous phase: 5 wt % PVA-ASE 60 (2:1) solution
Organic phase: 1:1 Tro-Grees-Petrolatum+15 wt % $Na_2SO_4$
Emulsification:
9:1 Aqueous:Organic phase Flotation machine, 650 rpm, 2 min.

| Pressure, psig | | | | Spray Height., | |
|---|---|---|---|---|---|
| Liquid | Air | L/G | U, m/s | cm | Diam., μm & morphology |
| 10 | 5 | 6.75 | 22.5 | 120 | >300 μm spheres with tails |
| | | | | 150 | 500–3000 μm spheres with tails |
| | | | | 200 | 800–1500 μm spheres |

U - Superficial air velocity m/g
L/G - Liquid to gas mass ratio dimensions

This example also shows that at liquid and air pressures of 5 and 10 psig respectively and using a spray height of 200 cm, discrete spherical capsules of 800–1500 μm can be obtained.

EXAMPLE 9

Materials and Process Conditions for Typical Matrix Capsule Preparation

EMULSIFICATION
Aqueous phase: 5 wt. % PVA-ASE 60 (2:1) solution
Organic phase: 15 wt. % Savinase [Protease enzyme, ex: Novo] in 1:1 Tro-grees:Petrolatum
Aqueous/Organic phase=9:1 (wt/wt)
Flotation machine, 600 rpm, 2 min.
SPRAYING
Two Fluid Spray Nozzle, 1500 μm opening
Air : 5 psig ; Liquid: 10 psig
Spray height: 200 cm
CAPSULE DIMENSIONS
Average core size=250 μm
Capsule size=200–800 μm The performance of enzyme capsules prepared under the conditions stated in Example 9 was tested against liquid enzyme [unencapsulated enzyme] on a cotton test cloth stained with casein [AS 10 test cloth, ex: Center for Test Materials] using a Tergo-to-meter. Tergo-to-meter is a laboratory standard equipment that mimics the dynamics of a washing machine. Details of Tergo-to-meter operation is given in the text.

EXAMPLE 10

Deterency Performance Comparision of Matrix Capsules and Liquid Savinase: Effect of Time and Temperature

| | Performance Ratio | |
|---|---|---|
| Temp. °C. | Wash time: 15 min. | Wash time: 30 min. |
| 20 | 0.46 | 0.58 |
| 30 | 0.81 | 0.87 |
| 40 | 0.85 | 0.95 |

Performance ratio=Detergency with capsules/Detergency with unencapsulated enzyme This example shows that the detergency obtained with the encapsulated enzyme is close to that of unencapsulated enzyme, especially above 30° C.

Detergency is defined by a value Delta Delta R which in turn, is defined as Delta R minus Delta R' where:

Delta R is the reflectance value (reflectance unit is an arbitrarily defined unit) of a full detergent composition (i.e., containing actives, electrolyte and enzymes) minus the reflectance value of detergent composition having electrolyte only; thus Delta R takes into account the effect of actives plus enzymes; and Delta R' is the reflectance value of a detergent composition containing actives and electrolyte (but no enzymes) minus the reflectance value of a detergent composiiton having electrolyte only; thus Delta R' takes into account the effect of actives only.

EXAMPLE 11

Stability of Savinase liquid vs encapsulated Savinase powder in HDL with bleach of the following composition:

| Component | Parts |
|---|---|
| Water | 24.8 |
| Sorbitol (70%) | 15.8 |
| Glycerol | 4.8 |
| Sodium borate 10 $H_2O$ | 4.8 |
| Sodium citrate 2 $H_2O$ | 9.5 |
| Narlex DC-1 (ex. National Starch & Chem.) | 3.0 |
| 50% NaOH | 5.4 |
| DB 100 (Dow Chem.) (Antifoam) | 0.1 |
| Alkylbenzene Sulfonic Acid (anionic) | 21.8 |
| Neodol 25-9 (nonionic) | 10.0 |
| TPCAP* (bleach) | 3,300 ppm active oxygen |

*N,N'-terephthaloyl di 6-aminopercarboxycaproic acid.

Half-life of liquid Savinase at 37° C.<1 day
Half-life of encapsulated Savinase powder at 37° C.=14 days This example shows that the capsules of the invention greatly improves half-life stability of an enzyme.

We claim:

1. A process for preparing matrix capsules comprising hydrocarbon cores dispersed in a polymer matrix, said cores being sufficiently large to contain large particle size actives wherein said capsule comprises:

(a) actives having a particle size of 0.01 to 500 microns which actives are subject to degradation in an aqueous liquid containing said capsules;

(b) a hydrocarbon core surrounding said actives sufficiently structured such that less than 10% of said actives phase separate from said cores at 37° C. in one week; and (c) a polymer shell surrounding said hydrocarbon core; wherein said process comprises:

(1) dispersing said active particles into hydrocarbon core material; and (2) dispersing the active containing hydrocarbon in a polymer solution to form a polymer matrix emulsion of drops of said hydrocarbon core material in said solution, said dispersion being obtained by utilizing a device at a flotation machine to produce shear rates of less than about 3500 s$^{-1}$ such that:

(i) no more than 50% active is released from said drop after shearing;

(ii) the hydrocarbon drops are 10 to 1000 microns; and (iii) the emulsion has no more than 5% phase separation for 8 hours or greater.

2. A process according to claim 1, wherein actives are 0.01 to 250 microns.

3. A process according to claim 2, wherein the actives are 0.01 to 100 microns.

4. A process according to claim 3, wherein the actives are 0.01 to 50 microns.

5. A process according to claim 1, wherein the active is a solid or liquid.

6. A process according to claim 1, wherein the active is a hydrophilic active selected from the group consisting of enzymes, bleach catalysts, peracid bleaches, bleach activators and optical brighteners.

7. A process according to claim 1, wherein he hydrocarbon core (1) retains at least 50% active after a dispersion of active in oil is added to an aqueous solution;

(2) demonstrates less than 10% phase separation at 37° C. over 1 week when active is added to the hydrocarbon to form a dispersion; and (3) releases more than 50% of active inside the hydrocarbon after first five minutes of a wash cycle measured at 50° C.

8. A process according to claim 1, wherein the hydrocarbon is liquid or semisolid at room temperature.

9. A process according to claim 1, wherein the hydrocarbon core is a liquid oil containing 0.5% to 15% hydrophobic particles having a particle size less than 3 microns and is described by Sisko rheological parameters wherein k is in the range of 10,000 to 50,000, n is in the range of 0.2 to 0.6 and $\eta_{28}$ is in the range of 50 to 2,000 centipoises.

10. A process according to claim 9, wherein the hydrocarbon core is a liquid oil containing 0.5% to 5% hydrophobic particles having particle size less than 1 micron.

11. A process according to claim 1, wherein the hydrocarbon core is a semisolid oil selected from the group consisting of petrolatum, molten wax, fats and fat derivatives.

12. A process according to claim 1, wherein the polymer forming the polymer matrix of the capsule is insoluble in a composition in which said capsules are found.

13. A process according to claim 1, wherein no more than 25% of active is released from the hydrocarbon core drops after shearing.

14. A process according to claim 13, wherein no more than 10% of active is released after shearing.

15. A process according to claim 1, wherein drops are 400 to 1,000 microns.

16. A process according to claim 1, wherein the polymer solution rheology can be described by Sisko rheological parameters with k varying in the range of 20,000 to 40,000; n varying with range of 0.3 to 0.5 and $\eta_{28}$ varying in the range of 100 to 1,000 centipoises.

17. A process according to claim 16, wherein the polymer is a mixture of polyvinyl alcohol and polyacrylate in the ratio by weight of 10 to 1.

18. A process according to claim 17, wherein ratio of polyvinyl alcohol to polyacrylate is 5 to 1.

19. A process according to claim 17, wherein ratio of polyvinyl alcohol to polyacrylate is 2 to 1.

20. A process according to claim 17, wherein ratio of polyvinyl alcohol to polyacrylate is 1 to 1.

21. A process according to claim 1, wherein the shear rate used is in the range of 100 to 3,000 s$^{-1}$.

22. A process according to claim 1, wherein the shear rate used is in the range of 500 to 2,000 s$^{-1}$.

23. A process according to claim 1, wherein the shear rate used is in the range of 1,000 to 1,500 s$^{-1}$.

24. A process according to claim 1, wherein said flotation machine is conventionally used for beneficiation of mineral ores.

* * * * *